Feb. 11, 1958 T. J. GLAZA ET AL 2,822,908
COMBINED WEIGHT MEASURING AND DUMPING DEVICE
Filed April 5, 1954 2 Sheets-Sheet 1
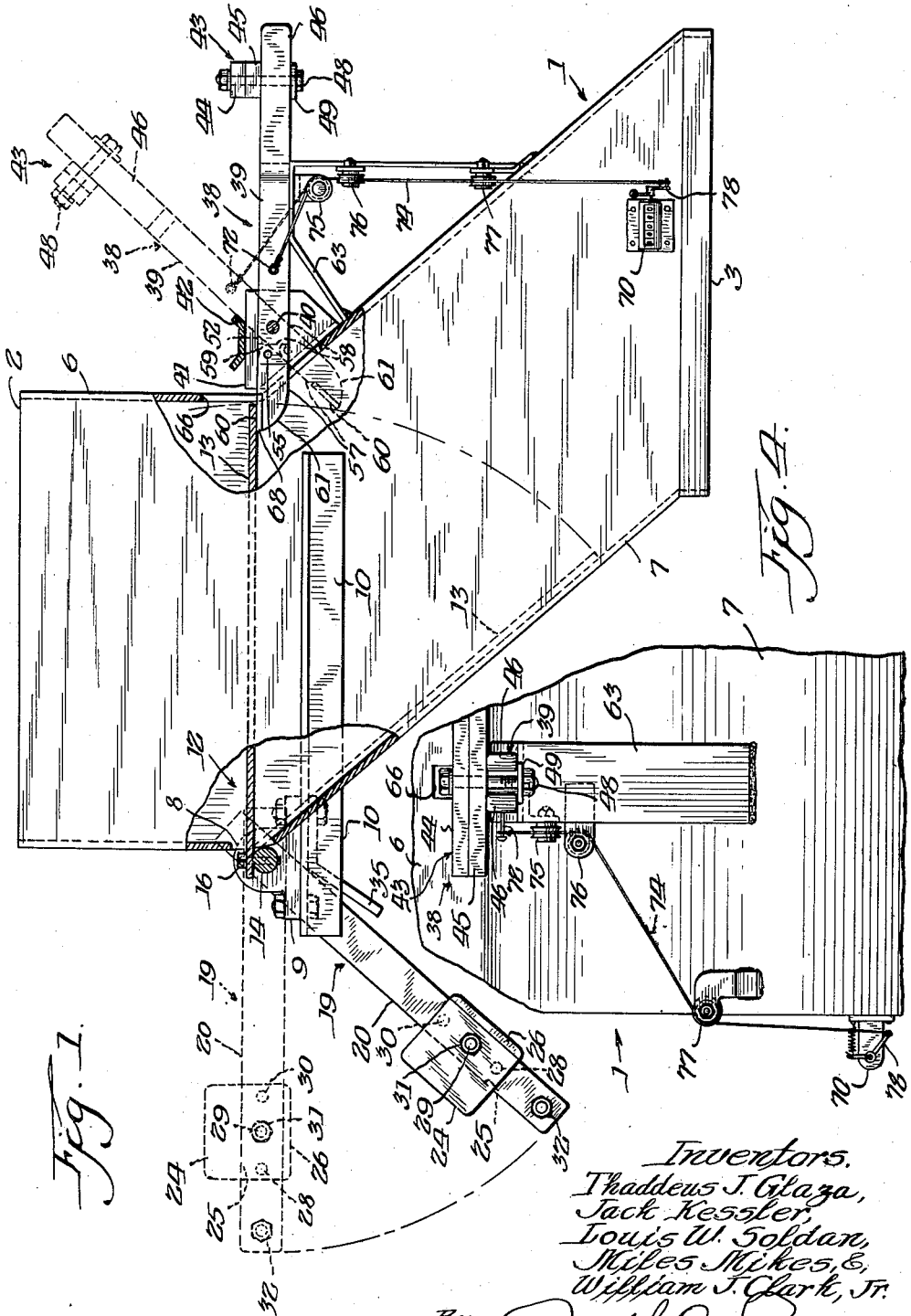
Inventors.
Thaddeus J. Glaza,
Jack Kessler,
Louis W. Soldan,
Miles Mikes, &
William J. Clark, Jr.
By Joseph O. Ray Atty Feb. 11, 1958 T. J. GLAZA ET AL 2,822,908
COMBINED WEIGHT MEASURING AND DUMPING DEVICE
Filed April 5, 1954 2 Sheets-Sheet 2
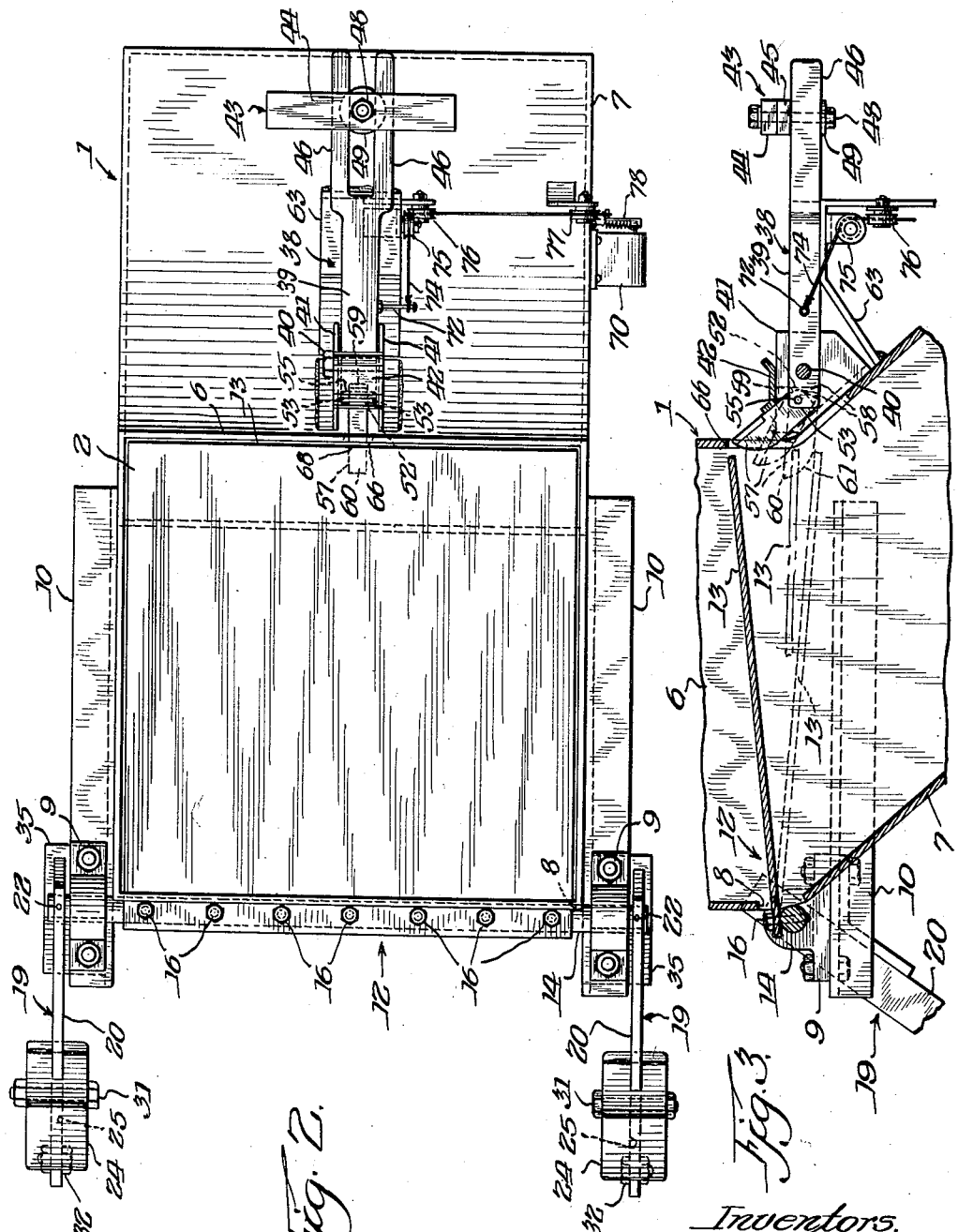
Inventors.
Thaddeus J. Glaza,
Jack Kessler,
Louis W. Soldan,
Miles Mikes, &
William J. Clark, Jr.

United States Patent Office 2,822,908
Patented Feb. 11, 1958

2,822,908

COMBINED WEIGHT MEASURING AND DUMPING DEVICE

Thaddeus J. Glaza, Jack Kessler, Louis W. Soldan, Miles Mikes, and William J. Clark, Jr., Chicago, Ill., assignors to Crane Co., Chicago, Ill., a corporation of Illinois Application April 5, 1954, Serial No. 421,088

4 Claims. (Cl. 193—18)

This invention relates generally to a device useful for measuring out a predetermined load by weight and automatically releasing said load. More particularly, it pertains to such device capable of performing repeated measuring and dumping operations and including means for automatically recording such operations whereby the rate of flow or the movement of items, such as rough castings in a foundry, for example, in terms of weight per given period of time being handled or processed may be determined for compilation or for control of the flow by adjustment of the feed into said device.

It is accordingly one of the more important objects of the invention to provide a device for determining the amount of items handled on a particular production line by weight each day or part of a day.

A further object is to provide a device for determining the flow of items of the character referred to in terms of weight whereby said flow may be adjusted and controlled to a predetermined rate.

Other objects and advantages will become more readily apparent upon proceeding with the specification read in light of the accompanying drawings, in which:

Fig. 1 is a side elevational view of the device of the invention, with the housing being partly broken away to show the interior parts.

Fig. 2 is a top plan view of the device shown in Fig. 1.

Fig. 3 is an enlarged fragmentary portion showing the drop bottom moving past the trip mechanism into loading position.

Fig. 4 is a fragmentary front view of the device.

Similar reference numerals refer to similar parts throughout the several views.

Referring in detail to Fig. 1 of the drawings, the weight measuring dumping device of this invention comprises an enclosed casing or housing generally designated 1 having an open top and bottom 2 and 3, respectively, for receiving and discharging articles or items entering the housing particularly at a uniform rate. The upper and lowermost portions of the housing may be welded or otherwise secured to other equipment forming a continuous path for the movement of the items or the housing may be so positioned as to receive items dropped thereinto and in turn discharge the same after the measuring operation into any desired receiving means for further movement or processing.

The housing 1 consists of an upper and lower container portion 6 and 7, respectively, the upper portion serving as a receiving chamber or hopper normally closed off at the bottom by a releasable door or barrier member 13 of rectangular form conforming to the inside configuration of said housing. Although this member is illustrated as being of a single piece of flat plate material, the structure may be perforated or constituted of bar stock or the like so as to be open. It may even be curved or dished so long as the items being measured are intercepted by the member 13 when in the normal load receiving position as indicated by dotted lines in Fig. 1. The lower portion 7 of the housing is shown in Fig. 1 to be angularly or forwardly disposed so as to discharge into a chute, not shown. This portion need not necessarily be so formed and it may be made straight with the upper portion or extended and otherwise directed or shaped as long as it permits movement of the barrier member 13 into a proper load discharging position therewithin.

It should be noted that the barrier member 13 forms part of a swinging or swingably mounted assembly or member generally designated 12 which comprises in addition to the barrier member a shaft or supporting member 14 to which the latter member is secured. More particularly, the said barrier member extends rearwardly through a slot-like opening 8 extending across the rear of the housing 1 at the juncture of the upper and lower portions 6 and 7 thereof and onto super-imposed relation with the shaft 14 as shown. The barrier member 13 is fixedly connected or secured to this member by the spaced bolts 16 or other suitable means. The shaft member 14 is in turn supported at each end by means of the bearings or journal boxes 9 mounted on a pair of angle irons 10 welded or otherwise secured to the housing 1 for swinging or pivotal movement of the assembly and of the barrier portion 13 thereof.

The shaft member 14 extends slightly beyond the bearing supports at each end to permit the connection thereto of a pair of counterweight members 19, the purpose of which will be hereinafter explained. Each of these members comprises an arm 20 having a bore or aperture at the inner end thereof for reception of the shaft 14, these arms being connected to the shaft for rotation therewith and for swinging movement with the assembly 12 by means of pins 22 extending through the upper portion of the arms into the shaft. Of course, it will be apparent that other means of connection for effecting relative non-rotation with the shaft may be employed if desired.

Intermediate the ends of each of the arms 20, a counterweight 24 is positioned, being slidable therealong by reason of being recessed longitudinally at 25 and retained by a bottom plate 26 welded or otherwise secured to the same. The arms are apertured at any desired place or preferably at a plurality of places such as 28, 29, 30 for receiving bolts 31 by means of which the counterweights are connected to the arms 20, a plurality of apertures providing for varied adjustment to the proper position. Bolts 32 may also be positioned through the lower end of the arms to prevent the counterweights from slipping off the ends during assembly or in the course of adjustment. Fastened to the ends of the angle iron supports 10 of the housing by suitable means such as welding are a pair of inclined plate elements 35 serving as stop means in one direction for limiting the swinging movement of the assembly 12 and the counterweight members 19 movable as a unit.

Mounted on the front end of the housing is the retaining structure generally indicated as 38 which cooperates to hold the barrier member 13 normally in the load receiving position shown partly in full lines in Fig. 1. This structure comprises a lever member 39 pivotally supported, as by means of the pin 40, to a pair of spaced plates 41 extending from the housing centrally thereof. Below the lever is a stop member 63 also extending from the housing for limiting the movement of the lever in one direction while the upturned plate 42 limits the lever movement in the opposite direction. At the forward end of the lever 39 is a counterweight 43 normally keeping the lever in positive contact with the stop 63. This counterweight is preferably made up of a plurality of bars 44, 45, the number of which can be varied to suit conditions, mounted on the spaced arm portions 46 of the lever member by means of a bolt 48 passing between the arms and through a washer 49 extending between the arms 46 at the bottom thereof. The position of this counterweight can be adjusted by loosening the bolt 48 and sliding the bars 44, 45 along the arms 46 forwardly or rearwardly as desired and then retightening.

The other end of the lever member 39 is slotted at 52 for reception of a catch member 57 pivotally mounted between the extending portions 53 thereof by means of a pin 55 passing therethrough. It should be noted that the said pin is located above the central axis of both the catch member and lever and that the back of the slot 52 and the end of the catch member below the pin at 58 are straight and in abutting contact with each other when the catch member is in the normal straight out position shown in full lines in Fig. 1. It should also be noted that the top of the catch member is preferably rounded as at 59. This arrangement prevents counterclockwise rotation of the catch member beyond the full line position shown, while at the same time it permits movement in the opposite direction until stopped by abutting contact with the upturned plate 42. Thus, effective means for limiting or stopping movement of the catch member beyond a certain point in one direction of movement is provided, while permitting movement in the opposite direction within the limit indicated.

The front portion of the housing is provided with an opening at 66 for admission of the rearward end of the lever member and the extending catch member 57 therewithin. This opening is elongated downwardly so as to provide for free pivotal movement of the said lever member and catch when depressed and operating as a unit. The rearward end of the catch member 57 projects well within the path of the swinging door or barrier member 13, as shown, and is adapted in cooperation with the lever member 39, the counterweight 43 and the stop member 63, to retain the same normally in the full line, the load receiving position shown in Fig. 1 by engaging the underside of the barrier member at 68 and holding the member in the upward or horizontal position.

In actual operation, it should be understood that the barrier or door member 13 is so retained in its upward position until a predetermined amount or quantity of items such as castings, by weight have been dropped into the top of the hopper as by belt conveyor and intercepted by the said barrier member. At this time, the total weight of the accumulated load is then sufficient to overbalance the counterweight 43 to cause the downward displacement of the catch member 57 and lever member 39 moving as a unit about the pin 40. The subsequent release of the barrier member by the catch member follows as the latter moves from under the former. The barrier member at this stage is then free to drop under the action of gravity into the lowermost position shown in dotted lines in Fig. 1 for discharge of the load therefrom and through the bottom of the housing. When relieved of its load, the barrier member 13 is then quickly returned to its normal load receiving position by means of the counterweights 24 acting through the arms 20 and the shaft 14, the catch member 57 at this stage being upwardly deflected between the side portions 53 of the lever member 39. In the meantime, the said lever has been returned to its original position against the stop 63 by the counterweight 43 and by the barrier member near the top of its movement to permit its passage above said catch member in the direction of reverse movement (see Fig. 3). The door 13 is then in position to be moved into tight engagement with the top of the catch member when initially loaded by the falling items until secured against further movement by means of the stop or limiting means between the catch and lever members and the counterweight 43 at the end of the lever, thus to complete the cycle of operation. The top of the catch member preferably has a suitable hard metal wearing surface at 60, while the lower surface is rounded at 61 in order to facilitate the upward displacement of the catch member by the door or barrier member.

The counterweights 24 are adjusted on the arms 20 so that the weight of the entire swinging unit comprising the counterweight members 19 and the assembly 12 is substantially balanced in the full line position shown in Fig. 1, whereby the barrier member 13 has in effect no weight, or stating it differently, exerts no force on the catch member 57 until the loading has commenced. The total load necessary to trip the lever member 39 acting through the projecting catch can therefore be easily calibrated and the counterweight 43 added to and/or adjusted to obtain the desired maximum or tripping load. To record the number of individual loading or weight measuring operations, a counter 70 is preferably mounted on the housing at a convenient location. Extending from the lever member 39 is a rod or pin 72 to which is connected a cable or the like 74. This cable runs over sheaves 75, 76, 77 to the counter 70, being adapted to pull up on the bell crank 78 thereof as the lever 39 is tripped into the upper dotted line position for the individual recordings.

Inasmuch as the tripping or dumping weight is calibrated and known, it is apparent that it is relatively a simple matter to determine the total weight of the items passing through the device in any perior of time by merely multiplying the number of trips of the mechanism as recorded by the counter for that period of time by the calibrated tripping weight. It is the practice in foundries where this device has been put into operation to log the work handled on a particular line or system for each day's operation.

Therefore, it should also be understood that another important function of the device is that of serving as a control means. Where it is desired to move items at a predetermined rate as for instance for piece work operations, such rate or flow of the items may conveniently be preserved or obtained in the first instance by merely checking the quantities passing through the device after the first hour or fraction of an hour of operation of the system and again after the second hour or fraction of an hour and so on against a standard rate or schedule and by making the necessary adjustment in the feed or movement of the items.

It should be apparent from the above description that a unique self-dumping weight measuring device has been produced having many useful applications to industry.

Although but a single form or embodiment of the invention has been disclosed, the same should not be limited to that form or to the details thereof which are only illustrative of the basis principles underlying the invention. Limitations should therefore be by way of the appended claims only read in the light of the specification and the overall broad spirit of the invention.

We claim:

1. A weight measuring device comprising in combination support means with an inner inclined surface, swinging means carried by said support means including load receiving means within said support means, said load receiving means at its lowermost swing position being upheld on said inner inclined surface of the said support means, means engageable between said load receiving means and support means to retain the aforesaid means normally in load receiving position, said retaining means being adapted to effect the release of said load receiving means upon the latter being substantially predeterminately loaded whereby the said swinging means moves into unloading position under action of the load, said retaining means comprising yieldable lever means mounted on said support means and catch means engageable between said load receiving means and lever means to prevent movement of said load receiving means beyond said lever means under action of said load until the load has substantially reached the predetermined amount and said lever means is displaced by said load receiving means acting through said catch means, said catch means being pivotally mounted relative to said support means and having a rounded transverse surface portion slidably engageable with an edge surface of said load receiving means prior to the latter member reaching its load receiving position, said retaining means comprising means exerting a force on said lever means thereof to resist displacement of the same and release of said load receiving means until said predetermined loading of the latter, means cooperating with said swinging means for returning said load receiving means slidably past said catch means and substantially to load receiving position after removal of the load.

2. A weight measuring dumping device comprising in combination a hollow support means with an inner inclined surface, swinging means carried by said support means including load receiving means therewith, said support means having means engageable with said load receiving means to normally retain the same in load receiving position, said load receiving means at its lowermost swing position being upheld on said inner inclined surface of the said support means at an angle substantially less than 90 degrees from the horizontal said retaining means being adapted to release said load receiving means for movement upon the latter receiving substantially a predetermined load whereby to discharge the load, means cooperating with said swinging means for automatically returning said load receiving means thereof substantially to load receiving position after discharge of the load, said retaining means comprising lever means pivotally mounted on said support means and stop means on said support means limiting movement of said lever means in one direction, said lever means having means in contact therewith normally urging the same into abutting engagement with said stop means, said lever means being provided with catch means for engagement with said load receiving means, said catch means being pivotally mounted on said lever means and being rotatable relative to said lever means to permit in sliding contact therewith the passage of an edge portion of said load receiving means therebeyond it in one direction as the same is being returned to its normal load receiving position, said catch means and lever means being pivotally engageable with each other so as to limit the return movement of said catch means beyond a given point upon movement of said load receiving means in the opposite direction to prevent further movement of said means until released at full loading by unitary displacement of said catch and lever means under the action of said load and movement of said lever means away from said stop means in opposition to said contact urging means.

3. A weight measuring dumping device of the character described comprising in combination a housing adapted to permit the flow of articles and material therethrough, swinging means mounted on said housing including barrier means predeterminately extending across the inside of an inclined surface of the said housing to permit flow therethrough, said housing having means engageable with said barrier means to normally retain the said barrier means in flow obstructing position, said retaining means being adapted to release said barrier means for movement upon substantially a predetermined loading thereof by weight by the accumulated flow whereby the accumulation may pass on through said housing, counterweight means cooperating with said swinging means for automatically returning said barrier means thereof substantially to its normal flow obstructing position after discharge of said accumulation, said retaining means comprising lever means pivotally mounted on said housing and stop means on said housing limiting movement of said lever means in one direction, said lever means having counterweight means connected thereto normally keeping the said lever means in contact with said stop means, said lever means being provided with catch means for predetermined sliding engagement with said barrier means, said catch means being pivotally mounted on said lever means and rotatable to permit the passage of said barrier means therebeyond it in one direction as the same is being returned to its normal flow obstructing position, said catch means and lever means being adapted to be engageable with each other and having a stop therebetween so as to limit the return movement of said catch means beyond a given point upon movement of said barrier means in the opposite direction to prevent further movement of said means until released at full loading by unitary displacement of said catch and lever means under the action of said load and movement of said lever means away from said first named stop means in opposition to said second counterweight means.

4. A weight measuring device for determining the rate of flow of articles and material comprising in combination a housing, swinging means mounted on said housing including barrier means normally extending across the inside of said housing to prevent flow therethrough, said housing having means engageable with said barrier means to normally retain the said barrier means in flow obstructing position, said retaining means being adapted to release said barrier means for movement in a direction to bear against an inside surface of the said housing upon substantially a predetermined loading thereof by weight by the accumulated flow whereby said accumulation may pass on through said housing, counterweight means cooperating with said swinging means for automatically returning said barrier means thereof substantially to its normal flow obstructing position after discharge of said accumulation, said retaining means comprising lever means pivotally mounted on said housing and stop means on said housing limiting movement of said lever means in one direction, said lever means having counterweight means connected thereto normally keeping the same in contact with said stop means, said lever means being provided with catch means for engagement with said barrier means, said catch means having a rounded top portion and being pivotally mounted on said lever means and being rotatable to permit the slidable passage of an edge portion of said barrier means therebeyond it in one direction as the said barrier means is being returned to its normal flow obstructing position, said catch means and lever means being adapted to be engageable with each other so as to limit the return movement of said catch means beyond a given point upon movement of said barrier means in the opposite direction to prevent further movement of said means until released at full loading by the unitary displacement of said catch and lever means under the action of said load and movement of said lever means away from said stop means in opposition to said second counterweight means.

References Cited in the file of this patent
UNITED STATES PATENTS

| | | |
|---|---|---|
| 307,140 | Radley | Oct. 28, 1884 |
| 1,748,826 | Bell et al. | Feb. 25, 1930 |